ELECTRONIC COLOR CORRECTION IN COLOR COPY REPRODUCTION

Filed Dec. 30, 1959

1

2

3,099,706

ELECTRONIC COLOR CORRECTION IN COLOR COPY REPRODUCTION

Rudolf Hell, Kiel, Roman Koll, Kiel-Wellingdorf, and Fritz-Otto Zeyen, Heikendorf, near Kiel, Germany, assignors to Dr.-Ing. Rudolf Hell Kommanditgesellschaft, Kiel, Germany, a corporation of Germany Filed Dec. 30, 1959, Ser. No. 862,871
Claims priority, application Germany Mar. 11, 1959
6 Claims. (Cl. 178—5.2)

Figure 1:
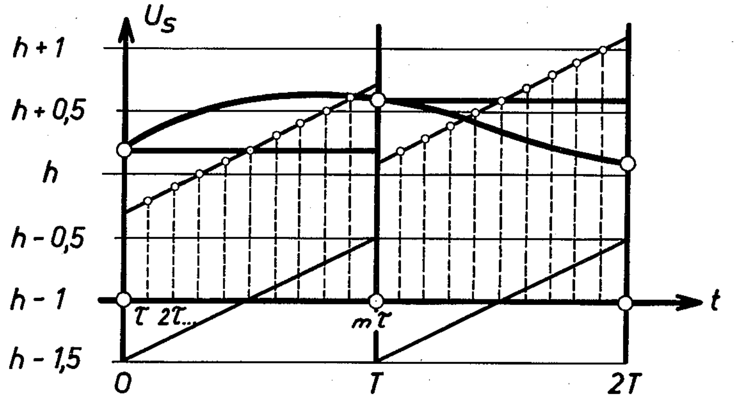

This invention is concerned with a method of and apparatus for electronic color correction and may be considered in the nature of an improvement on the disclosure contained in copending application Serial No. 792,666, filed February 11, 1959.

The copending application Serial No. 792,666 is concerned with electronic color correction in the reproduction of color copies or pictures, wherein a color picture or three photographic color separation records prepared therefrom are scanned directly as in facsimile telegraphy. The three continuously varying color measurement values $x, y, z$ (for instance, the standard color values of German Industrial Standard 5033) of the color dots of the copy which is to be reproduced are thereby each converted into a sufficiently large number of different discrete values, the three continuously varying color ink dosages $u, v\ w$ (for instance, the relative raster dot sizes or cell depths) for the color dots of the reproduction, which dosages are related to the values $x, y, z$ by three empirical or theoretical functions $u=b(x, y, z)$, $v=r(x, y, z)$ and $w=g(x, y, z)$, being likewise each converted into a sufficiently large number of discrete values, the color measurement values, in the form of proportional electric signals, being continuously supplied to an electronic storer in accordance with the rate of scanning, and the color ink dosages, in the form of proportional electric signals, being continuously removed from the storer at time intervals equal to or less than the time required to scan one picture dot.

The discrete color measurement value voltages are thereby obtained by briefly and periodically sampling or reading the three continuously vary color measurement value signals at at least twice the highest signal frequency, whereupon the sampled discrete instantaneous signal values are quantized or digitized.

Associated with each quantized color measurement value signal trio $x, y, z$ is an "And" gate of a three-dimensional switch matrix; such "And" gate responds only when all three color measurement value signal digits are present simultaneously.

Associated with the output of each "And" gate is a stored quantized color dosage signal trio $u\ v, w$ which is released from the storer only when the associated "And" gate is operated by a color measurement value signal trio.

The three color correction functions $b, r, g$ are defined by the kind of relationship provided by the matrix switch between the stored color dosage trios and the digitized color measurement value trios—that is, by the manner of wiring. These originally continuous functions, in which the continuously varying color measurement values and color dosage values have been replaced by a finite number of discrete values because of digitization or quantizing, are now discontinuous like tabulated functions. Hence if the number of digit stages is sufficiently large, interpolations can be made between the various discrete values as will be shown hereinafter.

If $h$ is the number of digit or quantum stages for each of the measured color values $x, y, z$, there are exactly $h^3$ different discrete measured color trios and correspondingly $h^3$ different matrix gates. Extending from the output of each matrix gate are a $u$-, $v$- and $w$-line—that is, 3 $h^3$ lines, $h^3$ similar lines of which always extend to the inputs of a $u$-, $v$- and $w$-storer in which the discrete color dosage values $u, v, w$ are stored. Lines of the same kind, for instance, $u$-lines, starting from different gates need not extend to different $u$-values. When any And gate is in the And condition, the associated $u, v, w$-value trio is released. Not more than $h^3$ different color dosage trios can be allocated to the $h$-3 different measured color value trios. But since a $u$-, $v$- and $w$-line extends from each of the $h^3$ matrix gates and each such line may extend to a different $u$-, $v$- or $w$-value, the maximum number of possible different associated $u$-, $v$- and $w$-values is $h^3$ each—that is, it is $h^2$ times higher than the digit stage number $h$ of each of the color measurement values $x, y, z$. It is very likely that amongst the $h^3$ associated $u, v$ and $w$ trios no two are present having the same $u$- or $v$- or $w$-values, that is, that all the $h^3$ different $u$-, $v$- and $w$-values appear once only.

The color dosage trios associated with the digitized color measurement value trios have now also been digitized—that is, the exact function values $u, v, w$ allocated to the discrete color measurement values $x, y, z$ on the basis of the color correction functions, $g, r, b$ have been replaced by the nearest discrete color dosage digits. The number of stages of the color dosage digits $u, v, w$ can be equal to or less or higher than the number of stages of the color measurement value digits. Except in special cases, the stage number of the color dosage digits will usually be equal to the stage number of the color measurement value digits—that is, equal to $h$. Therefore, of the $h^3$ different associated color dosage values $u$ and $v$ and $w$, on the average $h^2$ different values of each are converted by digitization into the same color dosage digit, provided that on the average all the $u$-, $v$- and $w$-digits occur equally often.

If the color measurement value digits and color dosage digits are arranged in ascending order of values, consecutive values need not be equidistant from one another.

For instance, when transparent color separation records are scanned photoelectrically, the primary color measurement values are transparencies. The transparency of a picture dot is the ratio of light energy passing through to incident light energy. From this the reciprocal of the transparency—that is, the opacity $O=1/T$, can first be obtained as a new color measurement value representing blackening. The logarithm of the opacity provides another color measurement value, the blackening $S=\log O=-\log T$ or by conversion $T=e^{-S}$. A uniformly divided blackening scale (constant difference between any two consecutive blackening stages) corresponds thereby to a logarithmically divided transparency scale (constant quotient of two consecutive transparency stages), the divisions of which become crowded in the direction of decreasing brightness.

If, as stated by way of example in the previously noted copending application, the number of digitizing stages for each of the three color measurement values $h=50$, the gate matrix contains $h^3=125,000$ And gates. Extending from the outputs of the matrix gates are a total of $3h^3=375,000$ lines, every $h^3=125,000$ of which extend to a $u$- or $v$- or $w$-store each having at least $h=50$ inputs. The number of matrix gates required increases with the cube of the number of digit stages.

It has been found that the number of digit stages required for the color measurement values and color dosage values depends upon the rate of change of brightening or blackening (per unit of length) when the lines of the uncorrected color separation records are scanned and when the lines of the corrected color separation records are recorded. Experiments on the transmission of digitized blackening stages in television have shown that as few as five stages are enough for very high rates of change of blackening—that is, for great structural richness, but that a very large number of stages of about 100 are required for very low rates of changes of blackening—that is, for structural poverty with very gradual changes of shade. The reason for this is that if an insufficient number of blackening stages are used to transmit the gradual changes, contiguous areas of constant blackening are formed in the corresponding areas of the reproduced image and lead to disturbing patterns not present in the original.

To obviate this disadvantage it has been proposed that the number of stages should be dependent upon picture content; a small number of stages would be used for high rates of change of blackening, large number of stages would be used for low rates of change and a medium number of stages would be used for medium rates of change. The rate of change of blackening can be gathered, for instance, from the instantaneous (unmodulated) signal frequency (video frequency) which is proportional to such rate of change. However, control arrangements for variable numbers of digit stages are very complicated and too expensive for the present purpose, so that working must be performed with a constant number of digit stages.

With a stage number $h=100$ the gate matrix would require $h^3=10^6$ gates and $3h^3=3\times10^6$ lines to the *u*-, *v*- and *w*-storers. While it is possible and, in modern electronic computers, even conventional to use such high numbers of electronic components despite the considerable and very time-consuming working required for the wiring, such an expenditure would not be economically bearable for a dividing device of an electronic color correction machine, since the main expenditure lies in the complicated scanning and recording devices which must operate with the highest precision.

A justifiable expenditure is obtained by using, for instance, $h=10$ stages, so that $h^3=1000$ matrix gates are required, resulting in $3h^3=3000$ outgoing *u*-, *v*- and *w*-lines. The maximum numbers of the *u*-, *v*- and *w*-storer inputs will then be 1000 each. The problem therefore is to provide about a tenfold increase in the number of blackening stages which have to be scanned on the input side and recorded on the output side, yet not to have to provide more than 10 digit stages in order to have 100 blackening stages.

To this end, according to the invention each of the three continuously variable color measurement value signals is additively heretrodyned (wobbled) with an alternating voltage having a frequency of at least twice the highest signal frequency (video frequency) and having an amplitude of at least half a digit stage, the wobbled color measurement voltages being scanned periodically and briefly at a frequency which is a multiple of the wobble frequency, and the scanned wobbled instantaneous signal values being in known manner quantized or digitized.

According to another feature of the invention, the amplitudes of the wobble frequencies are modulated by the scanned color measurement value signals in accordance with the variable digit stage differences of the color measurement value signal digits.

According to a further feature of the invention, the first method according to the invention is realized by the use of apparatus comprising three identical electrical channels for the three color measurement value signals, each such channel including a heterodyning stage, a periodic scanner and a digitizing stage, a sawtooth or delta generator serving as a wobble generator the voltage of which is heterodyned with the color measurement value signal voltages in the heterodyning stages, and a timing generator operating at a frequency which is a multiple of the wobble generator frequency and serving to synchronize the wobble generator and control the scanners.

According to still another feature of the invention, the second method according to the invention is realized by the use of apparatus wherein there is additionally provided for each electrical channel a modulation stage in which the wobble voltage is amplitude modulated by the signal voltage, which the modulated wobble voltage is additively heterodyned with the signal voltage in the heterodyning stage.

The invention is based on the following thoughts:

The reason for wobbling the color signal voltage with the sawtooth or delta alternating voltage is to ascertain how far the instantaneous signal scanned is separated from the immediately higher and immediately lower digit stage—that is, a statistical interpolation is made between two successive digit stages. Depending upon how often the immediately higher and immediately lower stage is encountered in the multiple scanning of the wobbled instantaneous signal value, the blackening of the associated corrected color separation record during the photographic recording of the color dosage values takes the form of digitized blackenings and lies between the two blackenings associated with the digit stages. For, each corrected picture dot, instead of being produced by a single digitized exposure pulse of the recording lamp, lasting for the duration of the period during which the instantaneous signal values are scanned, is built up from a number, for instance, ten, individual digitized exposure pulses which are each one-tenth as long as the original single pulse and which are distributed between two digit stages. The photographic layer adds up these various exposure pulse for each dot to form a mean exposure value, even though the individual exposure pulses belong, by virtue of their intensity, to different color dosage digits. Hence when the corrected color separation records are printed, intermediate blackenings are obtained due to the mixing of blackening digits.

It will be assumed that the frequency of the sawtooth or delta wobble voltage and the scanning frequency of the color information signals are twice the highest signal frequency (the scanning theorem used in communications shows that this step is sufficient to ensure that no information content is lost)—that is, about 2 kc./s.—and that the wobble voltage amplitude is equal to half a signal digit stage. It shall also be assumed that the periodically and briefly sampled instantaneous signal values are clamped (maintained constant) by a holding circuit for the duration of the scanning period. The choice of such a wobble amplitude ensures that the scanned and clamped instantaneous signal value, which is usually not a digit value, is so reduced and increased by the wobbling as to rise or fall linearly, in such manner that its maxima and minima definitely fall in two consecutive digit stages. A higher wobble amplitude might cover a greater number of adjacent digit stages which would be neither harmful nor helpful. If the wobbled instantaneous signal value is sampled briefly and periodically, for instance, ten times, during the wobble period which, in the example under consideration, is equal to the period during which the color signals are scanned, one half of the sampled values—that is, five in the example under consideration—will be less and the other half greater than the scanned instantaneous signal value. Since the scanning times are spaced evenly apart and the wobble voltage rises or falls linearly, theconsecutive rising or falling sample values within a wobble period are equidistant from one another.

Figure 2:
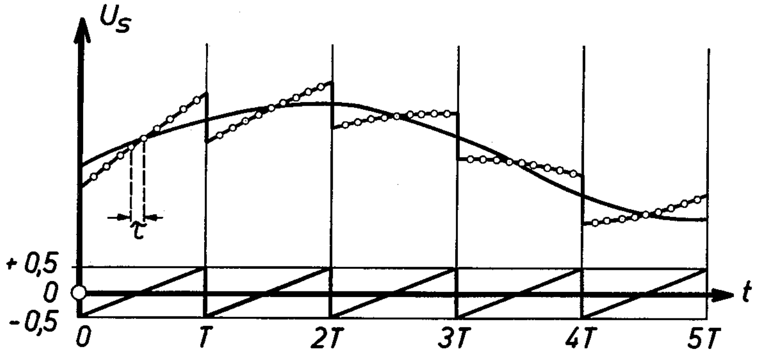

The methods and apparatus according to the invention will be explained in greater detail with reference to the accompanying drawing wherein:

FIGS. 1 and 2 each illustrate parts of the wobbled signal pattern; and

Figure 3:
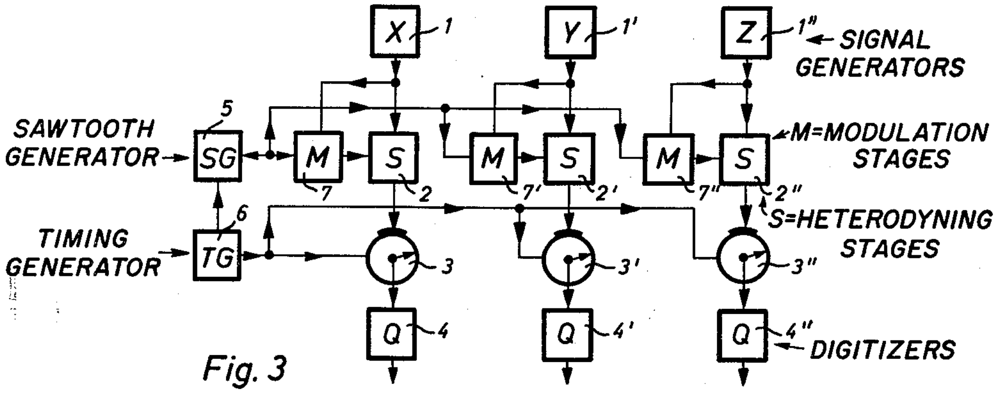

FIG. 3 illustrates a circuit arrangement for carrying into effect the methods according to the invention.

In FIG. 1, part of one of the color measurement value signal voltages $U_s$ is in graphic form plotted against the time *t* during two scanning periods T. Also shown is the pattern in time of a periodically rising sawtooth voltage of period T and of an amplitude equal to half a digit stage. The instantaneous values which are sampled at the times O, T, 2T . . . and which are not usually digit values are clamped (maintained constant) for the scanning period T and are illustrated as lines parallel with the $t$-axis. The wobbled instantaneous signal voltages—that is, the instantaneous voltages heterodyned with the sawtooth voltage and maintained constant for a scanning period—are illustrated as inclined lines with an inclination equal to the inclination of the sawtooth voltage. The beginnings and ends of the lines are at voltages lying at half a digit stage below or above the clamped instantaneous signal voltage. The center parts of the lines pass through voltages equal to the clamped instantaneous signal voltages. The same effect can be achieved by using as wobble voltage a falling sawtooth voltage or an alternately rising and falling delta voltage instead of a rising sawtooth voltage.

The wobbled clamped instantaneous signal voltages are scanned at a frequency which is a multiple of the frequency at which the signal voltage is scanned. If the latter frequency $f=2$ kc./s. as previously assumed, the scanning frequency F of the wobbled signal voltage can be $m$ times 2 kc./s., for instance, ten times, so that:

$$F=m\cdot f=10\cdot 2=20\ kc./s.$$

The period $\tau$ associated with scanning of the wobbled signal voltage is therefore the $m$th part—the tenth part in the example under consideration—of the period T associated with scanning of the unwobbled signal voltage, so that:

$$\tau=T/m=0.5/10\ \text{msec.}=50\ \mu\text{sec.}$$

The sampling times and sampled values of the wobbled signal voltage are equidistant. Since the wobbled signal voltage has a linear pattern, successive samplings have a constant difference of $1/m$ of a digit stage. The samplings are distributed symmetrically around the mean value—that is, the instantaneous signal voltage.

For a better understanding of the invention a numerical example will now be worked through.

It will be assumed that the sampled and clamped instantaneous signal voltage is $h+0.25$ voltage units, $h$ being an integral number of voltage units—that is, a digit voltage. The minima and maxima of the wobbled signal voltage are:

$$h+0.25-0.5=h-0.25$$

and $$h+0.25+0.5=h+0.75$$

The eleven samplings are therefore:

$h-0.25$; $h-0.15$; $h-0.05$; $h+0.05$; $h+0.15$; $h+0.25$; $h+0.35$; $h+0.45$; $h+0.55$; $h+0.65$; $h+0.75$.

When these eleven values are digitized, the first eight values will fall to the digit stage $h$ and the other three to the digit stage $h+1$. This means that the mean for the eleven values will be:

$$\frac{8h+3(h+1)}{11}=\frac{11h+3}{11}=h+0.27$$

If there had been no such multiple scanning of each picture dot, the digitization of the sampling value $h+0.25$ would have resulted in $h$.

In the multiple scanning of each picture dot the statistical interpolation between the digitized values $h$ and $h+1$ adjacent the real instantaneous signal value leading to a decimal—$h+0.3$—is obtained which is much nearer the instantaneous value $h+0.25$ than is the digitized value $h$, although there has been no increase in the number of digit stages. However, the effect is just as if the number of digit stages had been increased.

The result of the linear interpolation between two digitized values of the color measurement voltages in the scanning of the uncorrected color separation records is that, when the corrected color separation records are printed, there is a corresponding linear interpolation between those two digitized values of the color dosage voltages which, in accordance with the color correction functions, are associated with the digitized color measurement value voltages. The result of multiple scanning is, therefore, that any dot of one of the corrected records, instead of being exposed by a single pulse of the recording lamp of an intensity corresponding to the relevant color dosage digit, is exposed in the same time by $m$ exposure pulses which are each of $1/m$ duration and which, depending upon their intensity, are distributed to two of the color dosage digits corresponding to them. These two different intensities of the irradiation pulses are added up in the photographic film to produce a blackening lying between the two digitized blackenings which would be produced by either of the two digitized irradiation intensities separately.

It has been found that in practice there is no need to follow the original assumption that the instantaneous values scanned at a frequency of at least twice the signal frequency are clamped (maintained constant) by a holding circuit for the duration of the scanning period. All that is required is for the continuously variable signal voltage to be deterodyned directly with the sawtooth or delta wobble voltage, provided that the frequency thereof is at least twice the highest signal frequency or preferably a multiple thereof.

The attendant conditions are shown in FIG. 2. A reduced part of the pattern of one of the color signal voltages ($U_s$) is plotted against time $t$, and there can also be seen a number of periods of the sawtooth wobble voltage, of an amplitude equal to half of a quantum stage, and the wobbled signal voltage. This signal voltage is scanned periodically and briefly at a frequency which is a multiple of the wobble frequency. Due to the generally curved pattern of the signal voltage, the result of the heterodyning is not linear. The scanning times are still spaced evenly apart but the sampled values are no longer equidistant from one another. At the start of each wobble period the wobbled signal voltage lies half a quantum stage below or above the unwobbled signal voltage, while at the end of each wobble period the wobbled signal voltage lies above or below the unwobbled signal voltage, depending upon whether the sawtooth wobble voltage rises or falls.

Also, the mean steepness of the wobbled signal voltage within a wobble period is greater or less than the mean steepness of the unwobbled signal voltage, depending upon whether the sawtooth voltage rises or falls.

If the wobble frequency is high enough—that is, at least equal to the video frequency—the curved parts of the signal voltage within the wobble periods can be regarded as straight with sufficient accuracy, for if the abscissae are sufficiently subdivided, a curve can be approximated by a secant polygon inscribed in it.

The effect of the wobbling is therefore that the multiple scanning of the mean value of the straight but inconstant signal voltage part within a wobble period shows how often the mean value falls in adjacent digit or quantum stages. In other words, a signal voltage which rises or falls rectilinearly within a wobble period is replaced by its mean value in the center of the wobble interval as if such mean value remained constant for the duration of the wobble period.

When a rising sawtooth voltage is hetorodyned, for instance, with a rectilinearly rising part of the signal voltage, the result of the heterodyning—that is, the wobbled part of the signal voltage—is also rectilinear and steeper than the individual steepnesses of the signal voltage and sawtooth voltage. Since the amplitude of the sawtooth voltage is half a digit or quantum stage, the beginning and end of the wobbled signal voltage part may fall into more than two adjacent digit or quantum stages which, as previously mentioned, is neither harmful nor useful. However, when a falling sawtooth voltage is heterodyned with a rising section of signal voltage, the result of the heterodyning is less steep than the sawtooth voltage, and the beginning and end of the wobbled signal voltage part may fall in one digit stage only. Apparently, therefore, wobbling is useless in such a case, for the feature which it is intended to provide—that is, the covering of more than one digit or quantum stage—is nullified. Similar considerations apply when a falling part of the signal voltage is heterodyned with a rising sawtooth voltage. Apparently, therefore, rising signal voltages should be heterodyned only with a rising sawtooth voltage and falling signal voltages should be heterodyned only with a falling sawtooth voltage, but this would mean that a rising sawtooth voltage would have to be converted into a falling voltage after a signal voltage maximum and, conversely, the falling sawtooth voltage would have to be converted into a rising voltage after a signal voltage minimum.

Apart from the fact, however, that such automatic reversal of sawtooth voltage direction by the maxima and minima of the signal voltage would be possible but too complicated, it is unnecessary. As already mentioned, the purpose of the wobbling is to provide, and above all in the very gradual chcanges of shade—that is, in the case of structure poverty where the rate of change of blackening is reduced—a decimal, using statistical interpolation, between two adjacent digit or quantum stages, a feature which in the event is equivalent to increasing the number of stages in the manner actually required. However, in picture parts of pronounced structure poverty the alteration of the signal voltage within one period of the high wobble frequency is so small that the signal voltage can be regarded as substantially constant. The extent to which the signal voltage varies the steepness of the heterodyned sawtooth voltage is then so small that the steepness of the wobbled signal voltage is substantially equal to the steepness of the sawtooth voltage. Substantially, therefore, the conditions initially assumed are present—that is, the periodically sampled instantaneous signal voltages are clamped by a holding circuit for the duration of the scanning period. It is accordingly immaterial whether the wobble voltage rises or falls, as with a sawtooth voltage, or rises and falls alternately, as with a delta voltage.

On the other hand, in picture areas having great structure richness—that is, where the rate of change of blackening is high—a very reduced number of digit or quantum stages which are at any rate present suffices, so that no wobbling is required at such parts of the picture. The wobbling could therefore be omitted at such picture parts. However, since an automatic control would then be required but would be too expensive, picture areas of great structure richness are also wobbled and, as already stated, the effect of such wobbling is neither helpful nor harmful.

FIG. 3 shows in schematic block diagram manner apparatus for carrying into effect the methods according to the invention. The apparatus comprises three identical electrical channels for the measured color value signals $x, y, z$. The references 1, 1', 1'' denote three signal generators delivering three measured color value signal voltages $x, y, z$. The references 2, 2', 2'' denote three heterodyning stages (S) in which a sawtooth or delta voltage is additively superheterodyned with the signals $x, y, z$. The references 3, 3', 3'' denote three electromechanical (rotating) or electronic scanners for periodically and briefly scanning the wobbled measured color value signals. Following the scanners are three digitizers (Q) 4, 4', 4''. The reference 5 (SG) denotes a generator delivering a sawtooth or delta voltage of a frequency which is equal to or a multiple of twice the highest (unmodulated) signal frequency. This frequency varies from two to 10 kc./s. The sawtooth generator (SG) 5 synchronizes a timing generator (TG) 6 delivering pulses of a frequency equal to a multiple of the frequency of the generator 5. The timing frequency can be from 10 to 100 kc./s. Pulses of the timing generator control or synchronize the scanners 3, 3', 3''. If the digit or quantum stages are equidistant from one another, the sawtooth voltage delivered by the generator 5 is supplied directly to the control inputs of the heterodyning stages 2, 2', 2'' to wobble the color signal voltages. If the digit or quantum stages are not equidistant from one another, for instance, if the measured color values are blackenings, there is additionally provided for each channel one modulation stage each 7, 7', 7'' in which the amplitude of the sawtooth or delta voltage delivered by the generator 5 is modulated in different ways by the color signal voltages delivered by the signal generators 1, 1', 1'' before the amplitude modulated wobble voltages are heterodyned with the color signal voltages in the heterodyning stages (S) 2, 2', 2''.

The digitized or quantized color signals leaving the devices 4, 4', 4'' are further processed for color correction in the manner described in the initially mentioned copending application.

Changes may be made within the scope and spirit of the appended claims which define what is believed to be new and desired to have protected by Letters Patent.

We claim:

1. Apparatus for effecting electronic color correction in the reproduction of color copies, wherein a color copy or three photographic color separation records prepared therefrom are scanned directly as in facsimile telegraphy and the color measurement values thus obtained are digitized and converted into color dosage values which are likewise digitized comprising three identical electrical channels each including a heterodyning stage for additionally wobbling each of the three respective continuously variable color measurement value voltages with an alternating voltage of the same frequency, said alternating voltage having a frequency of at least twice the highest signal frequency and having an amplitude of at least half a digit stage, means forming a sampler for periodically sampling the wobbled color measurement voltages at a frequency which is a multiple of the wobble frequency, and means for digitizing the wobbled instantaneous signal values.

2. Apparatus according to claim 1, comprising a wobble generator for producing a voltage heterodyned with the color measurement value signal voltages in the heterodyning stages, and a timing generator for synchronizing the wobble generator and for controlling said sampling means.

3. Apparatus according to claim 1, wherein the amplitudes of the wobble voltages are variably modulated by the scanned color measurement value signals in accordance with the variable digit stage differences of the color measurement signal digits, comprising for each electrical channel a modulation stage in which the wobble voltage is amplitude-modulated by the signal voltage before the modulated wobble voltage is heterodyned with the signal voltage in the heterodyning stage.

4. Apparatus according to claim 2, wherein the amplitudes of the wobble voltages are variably modulated by the scanned color measurement value signals in accordance with the variable digit stage differences of the color measurement signal digits, comprising for each electrical channel a modulation stage in which the wobble voltage is amplitude-modulated by the signal voltage before the modulated wobble voltage is heterodyned with the signal voltage in the heterodyning stage.

5. Apparatus according to claim 2, wherein said wobble generator is operative to produce a sawtooth alternating voltage.

6. Apparatus according to claim 2, wherein said wobble generator is operative to produce a delta alternating voltage.

References Cited in the file of this patent

UNITED STATES PATENTS

| | | |
|---|---|---|
| 2,664,462 | Bedford et al. | Dec. 29, 1953 |
| 2,677,721 | Bedford | May 4, 1954 |
| 2,873,312 | Moe | Feb. 10, 1959 |
| 2,892,015 | Jones | June 23, 1959 |